(12) United States Patent
Chung

(10) Patent No.: US 7,969,036 B2
(45) Date of Patent: Jun. 28, 2011

(54) APPARATUS FOR GENERATING ELECTRIC POWER USING WIND ENERGY

(76) Inventor: Chun-Neng Chung, Pingtung County (TW)

( * ) Notice: Subject to any disclaimer, the term of this patent is extended or adjusted under 35 U.S.C. 154(b) by 529 days.

(21) Appl. No.: 12/125,333

(22) Filed: May 22, 2008

(65) Prior Publication Data

US 2009/0289459 A1    Nov. 26, 2009

(51) Int. Cl.
*F03D 9/00* (2006.01)
*H02P 9/04* (2006.01)
(52) U.S. Cl. ............................................. 290/55; 290/44
(58) Field of Classification Search .................. 290/44, 290/55
See application file for complete search history.

(56) References Cited

U.S. PATENT DOCUMENTS

| | | | | |
|---|---|---|---|---|
| 455,858 A | * | 7/1891 | Pepper | 416/41 |
| 485,933 A | * | 11/1892 | Herman | 416/119 |
| 537,494 A | * | 4/1895 | Stevens et al. | 415/164 |
| 1,248,305 A | * | 11/1917 | Gallagher | 415/149.1 |
| 1,531,015 A | * | 3/1925 | Maine | 415/4.2 |
| 1,595,578 A | * | 8/1926 | Sovereign | 415/186 |
| 2,812,823 A | * | 11/1957 | De Oviedo | 415/129 |
| 3,938,907 A | * | 2/1976 | Magoveny et al. | 415/141 |
| 4,039,849 A | * | 8/1977 | Mater et al. | 290/55 |
| 4,118,637 A | * | 10/1978 | Tackett | 290/55 |
| 4,269,563 A | * | 5/1981 | Sharak et al. | 415/186 |
| 4,365,929 A | * | 12/1982 | Retz | 415/53.1 |
| 4,486,143 A | * | 12/1984 | McVey | 415/164 |
| 4,551,631 A | * | 11/1985 | Trigilio | 290/55 |
| 4,834,610 A | * | 5/1989 | Bond, III | 415/53.3 |
| 5,126,584 A | * | 6/1992 | Ouellet | 290/55 |
| 5,380,149 A | * | 1/1995 | Valsamidis | 415/2.1 |
| 5,391,926 A | * | 2/1995 | Staley et al. | 290/55 |
| 5,463,257 A | * | 10/1995 | Yea | 290/55 |
| 5,503,530 A | * | 4/1996 | Walters | 416/197 A |
| 5,664,418 A | * | 9/1997 | Walters | 60/398 |
| 6,309,172 B1 | * | 10/2001 | Gual | 415/4.4 |
| 6,465,899 B2 | * | 10/2002 | Roberts | 290/44 |
| 6,666,650 B1 | * | 12/2003 | Themel | 416/200 R |
| 6,740,989 B2 | * | 5/2004 | Rowe | 290/55 |
| 6,749,393 B2 | * | 6/2004 | Sosonkina | 415/4.1 |
| 6,841,894 B2 | * | 1/2005 | Gomez Gomar | 290/55 |
| 6,870,280 B2 | * | 3/2005 | Pechler | 290/55 |
| 6,966,747 B2 | * | 11/2005 | Taylor et al. | 415/1 |
| 7,235,893 B2 | * | 6/2007 | Platt | 290/54 |
| 7,242,108 B1 | * | 7/2007 | Dablo | 290/55 |
| 7,329,965 B2 | * | 2/2008 | Roberts et al. | 290/55 |
| 7,397,144 B1 | * | 7/2008 | Brostmeyer et al. | 290/53 |
| 7,400,057 B2 | * | 7/2008 | Sureshan | 290/55 |
| 7,425,776 B2 | * | 9/2008 | Ketcham | 290/55 |
| 7,573,148 B2 | * | 8/2009 | Nica | 290/55 |

(Continued)

*Primary Examiner* — Pedro J Cuevas
(74) *Attorney, Agent, or Firm* — Christie, Parker & Hale, LLP

(57) ABSTRACT

An apparatus includes a blade unit including having upright blades connected fixedly to an upright rod that has a lower end disposed pivotally in a base such that the blade unit is rotatable relative to the base to convert wind energy into a mechanical rotary power output, and coupled to a generator in the base to convert the mechanical rotary power output into electric power. Each blade has opposite first and second side surfaces. The first side surface of each blade faces the second side surface of an adjacent blade. A wind-collecting unit includes upright plates fixed on the base, angularly equidistant and disposed around the blade unit. Any two adjacent plates define an inwardly converging wind-guiding channel therebetween. The plates are shaped so that wind is guided by the plates to blow onto the first side surfaces of the blades via the wind-guiding channels.

13 Claims, 11 Drawing Sheets

U.S. PATENT DOCUMENTS

| | | | |
|---|---|---|---|
| 7,605,491 B1 * | 10/2009 | Chung | 290/55 |
| 7,633,177 B2 * | 12/2009 | Platt | 290/54 |
| 7,766,601 B2 * | 8/2010 | Vida Marques | 415/4.2 |
| 2002/0047276 A1 * | 4/2002 | Elder | 290/55 |
| 2002/0109358 A1 * | 8/2002 | Roberts | 290/54 |
| 2003/0025335 A1 * | 2/2003 | Elder | 290/55 |
| 2003/0035725 A1 * | 2/2003 | Sosonkina | 416/11 |
| 2005/0006904 A1 * | 1/2005 | Bayer | 290/55 |
| 2006/0275105 A1 * | 12/2006 | Roberts et al. | 415/4.2 |
| 2008/0023964 A1 * | 1/2008 | Sureshan | 290/55 |
| 2009/0191057 A1 * | 7/2009 | Knutson | 416/23 |
| 2009/0288913 A1 * | 11/2009 | Nielsen | 182/8 |
| 2009/0322095 A1 * | 12/2009 | Mazur | 290/55 |
| 2009/0324383 A1 * | 12/2009 | Mazur | 415/4.2 |
| 2010/0202883 A1 * | 8/2010 | Daley et al. | 416/140 |
| 2010/0213722 A1 * | 8/2010 | Scott | 290/55 |
| 2010/0230974 A1 * | 9/2010 | Cantwell | 290/55 |
| 2010/0254799 A1 * | 10/2010 | Caines | 415/36 |
| 2010/0303618 A1 * | 12/2010 | Penn | 415/208.2 |
| 2011/0025064 A1 * | 2/2011 | Park | 290/50 |
| 2011/0027062 A1 * | 2/2011 | Moore et al. | 415/1 |
| 2011/0033288 A1 * | 2/2011 | Pezaris | 415/208.1 |

* cited by examiner

APPARATUS FOR GENERATING ELECTRIC POWER USING WIND ENERGY

BACKGROUND OF THE INVENTION

1. Field of the Invention

The invention relates to an apparatus for generating electric power from wind energy.

2. Description of the Related Art

Referring to FIG. 1, a conventional apparatus 1 for generating electric power from wind energy is shown to include a windmill 12 and a generator 13. The windmill 12 includes an upright prop 121 mounted fixedly on a supporting surface (not shown), and a wind impeller 122 having a plurality of blades. The windmill 12 converts wind energy into a mechanical rotary power output. The generator 13 is coupled to the windmill 12 to convert the mechanical rotary power into electric power.

The following are some of the drawbacks of the conventional apparatus 1:

1. A height of the prop 121 of the windmill 12 is about 70 meters, and a length of each blade of the wind impeller 122 of the windmill 12 is about 35 meters, thereby resulting in a relatively large space requirement. Therefore, the conventional apparatus 1 has to be located at a remote place far from a densely populated area, thereby resulting in inconvenience during implementation.

2. The arrangement of the conventional apparatus 1 cannot ensure stable electric generation for an area having wind from various directions.

SUMMARY OF THE INVENTION

Therefore, an object of the present invention is to provide an apparatus for generating electric power using wind energy that can overcome the aforesaid drawbacks of the prior art.

According to the present invention, there is provided an apparatus for generating electric power from wind energy. The apparatus comprises:

a base;

a blade unit including an upright rod extending vertically along a pivot axis and having a lower end disposed pivotally in the base, and an upper end, and at least one blade member having a plurality of upright blades connected fixedly to the upright rod such that the blade unit is rotatable relative to the base about the pivot axis so as to convert wind energy into a mechanical rotary power output, each of the blades having opposite first and second side surfaces, the first side surface of each of the blades facing the second side surface of an adjacent one of the blades;

a generator disposed in the base and coupled to the lower end of the upright rod of the blade unit to convert the mechanical rotary power output into electric power; and a wind-collecting unit mounted fixedly on the base, and including a plurality of upright plates angularly equidistant and disposed around the blade unit, any two adjacent ones of the upright plates defining an inwardly converging wind-guiding channel therebetween.

The upright plates of the wind-collecting unit are shaped so that wind is guided by the upright plates of the wind-collecting unit to blow onto the first side surfaces of the blades of the blade member of the blade unit via the wind-guiding channels in the wind-collecting unit.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
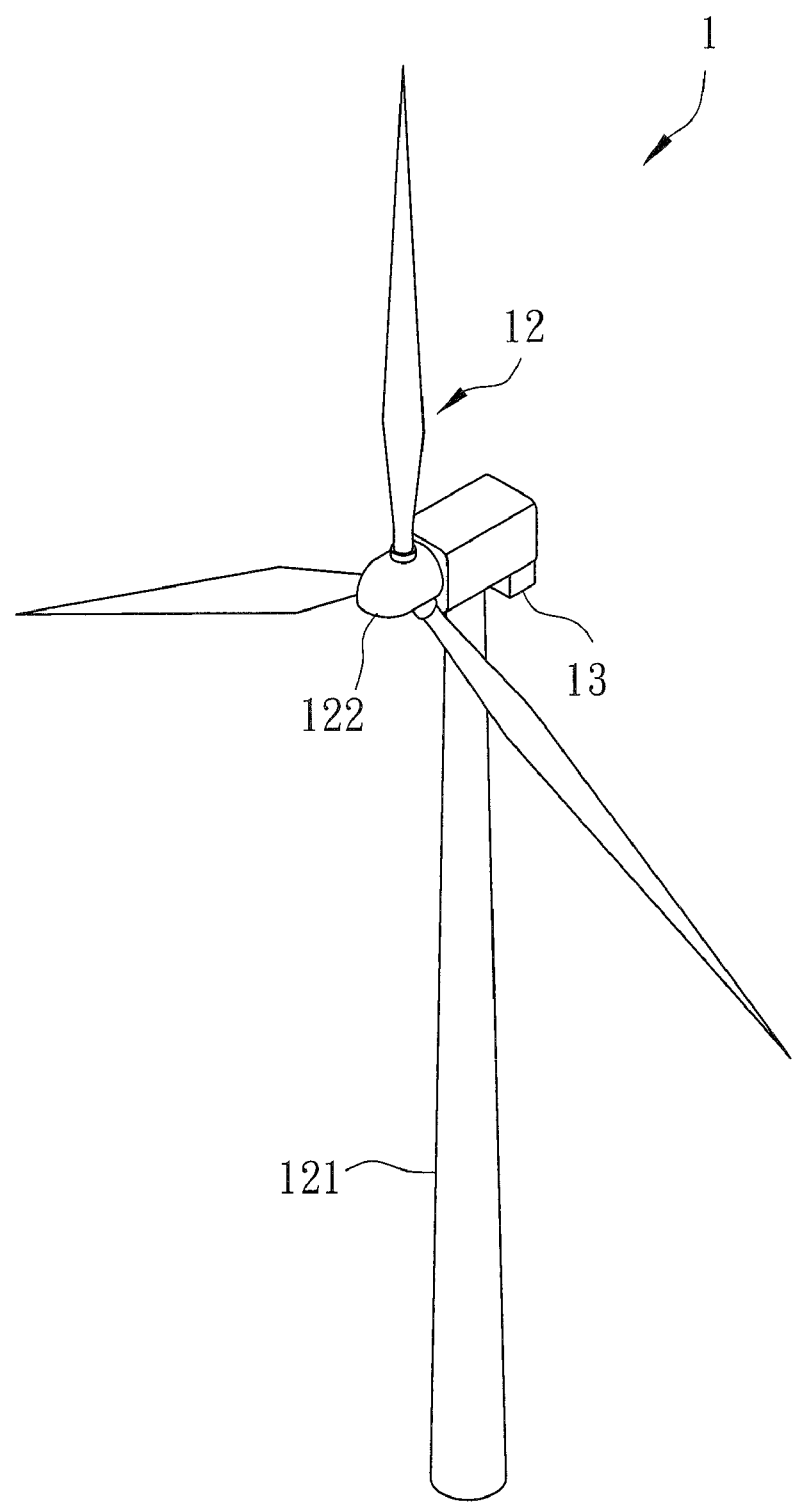
FIG. 1 is a perspective view of a conventional apparatus for generating electric power using wind energy.

Before the present invention is described in greater detail, it should be noted that like elements are denoted by the same reference numerals throughout the disclosure.

Figure 2:
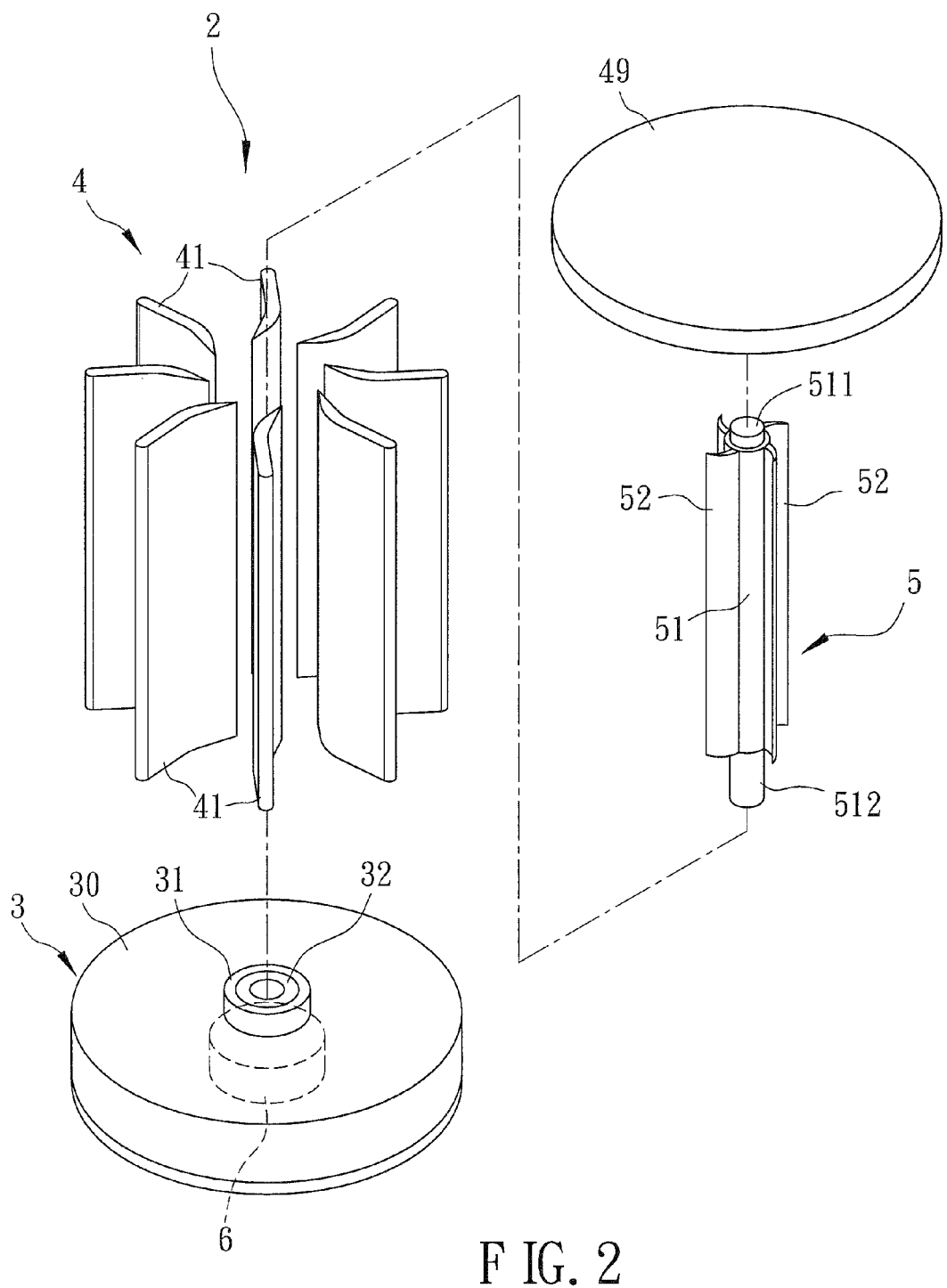
FIG. 2 is a partly exploded perspective view showing the first preferred embodiment of an apparatus for generating electric power using wind energy according to the present invention.
Figure 3:
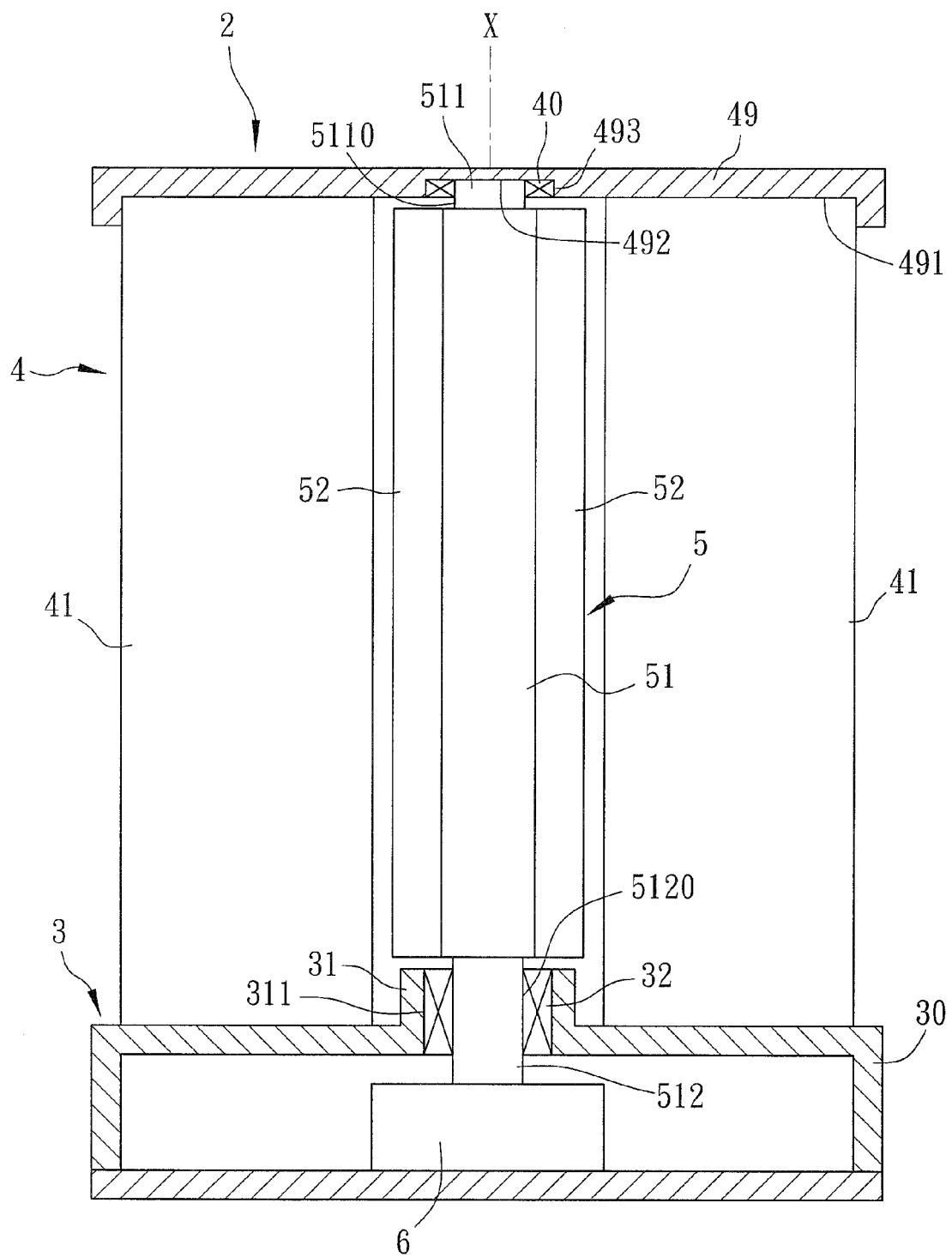
FIG. 3 is a schematic sectional view showing the first preferred embodiment.
Figure 4:
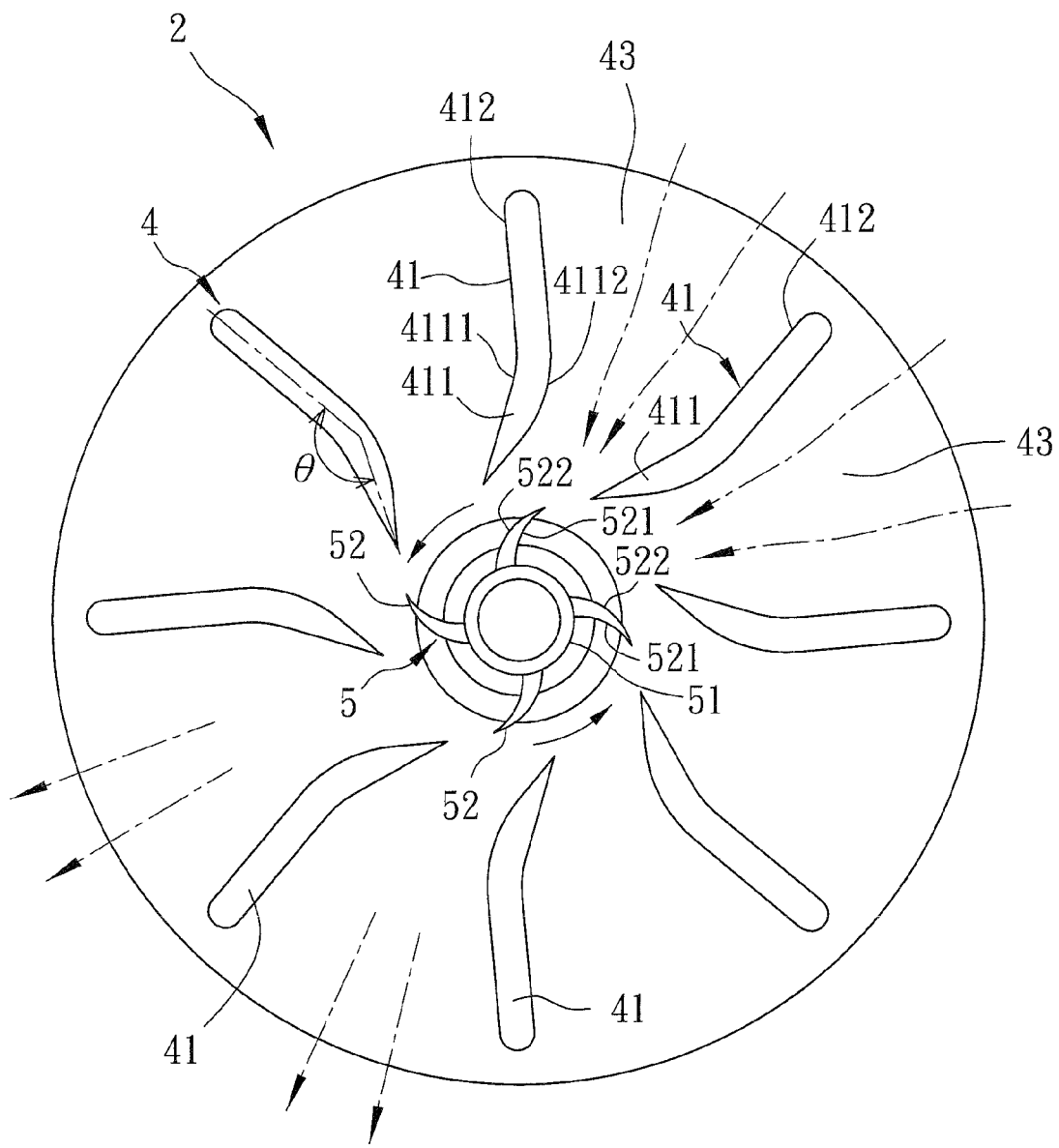
FIG. 4 is a schematic top view showing the first preferred embodiment without a top wall.

Referring to FIGS. 2 to 4, the first preferred embodiment of an apparatus 2 for generating electric power using wind energy according to the present invention is shown to include a base 3, a blade unit 5, a generator 6, and a wind-collecting unit 4.

In this embodiment, the base 3 includes a base body 30, a mounting tube 31 extending upwardly from a top side of the base body 30, and a bearing 32 disposed in the mounting tube 31.

The blade unit 5 includes an upright rod 51 extending vertically along a pivot axis (X) and having a lower end 512 disposed pivotally in the base 3 and extending through the mounting tube 31 and into the base body 30, and a blade member, which has a plurality of upright blades 52 connected fixedly to the upright rod 51, such that the blade unit 5 is rotatable relative to the base 3 about the pivot axis (X) so as to convert wind energy into a mechanical rotary power output. The bearing 32 is disposed between an outer annular surface 5120 of the lower end 512 of the upright rod 51 and an inner annular surface 311 of the mounting tube 31 of the base 3, as shown in FIG. 3. Each blade 52 has opposite first and second side surfaces 521, 522, and the first side surface 521 of each blade 52 faces the second side surface 522 of an adjacent blade 52, as shown in FIG. 4.

The generator 6 is disposed in the base body 30 of the base 3, and is coupled to the lower end 512 of the upright rod 51 of the blade unit 5 to convert the mechanical rotary power output into electric power.

The wind-collecting unit 4 is mounted fixedly on the base 3, and includes a plurality of upright plates 41 angularly equidistant and disposed around the blade unit 5, a top wall 49, and a bearing 40. Any two adjacent ones of the upright plates 41 define an inwardly converging wind-guiding channel 43 therebetween. The upright plates 41 are shaped so that wind is guided by the upright plates 41 to blow onto the first side surfaces 521 of the blades 52 of the blade member of the blade unit 5 via the wind-guiding channels 43. As shown in FIG. 4, each upright plate 41 has a first end portion 411 adjacent to the blade unit 5 and extending in a non-radial direction, and a second end portion 412 opposite to the first end portion 411, and is bent so that an obtuse angle (θ) is formed between the first and second end portions 411, 412. The obtuse angle (θ) ranges from 135° to 165°. The first end portion 411 of each upright plate 41 has a thickness that decreases gradually toward the blade unit 5. In this embodiment, the first end portion 411 of each upright plate 41 has a flat first surface 4111, and a curved second surface 4112 opposite to the flat first surface 4111. The top wall 49 is mounted on top ends of the upright plates 41, and has a bottom surface 491 formed with a positioning groove 492 that permits extension of the upper end 511 of the upright rod 51 of the blade unit 5 thereinto and that is defined by an inner annular surface 493 of the top wall 49. The bearing 40 is disposed between the inner annular surface 493 of the top wall 49 and an outer annular surface 5110 of the upper end 511 of the upright rod 51 of the blade unit 5.

Figure 10:
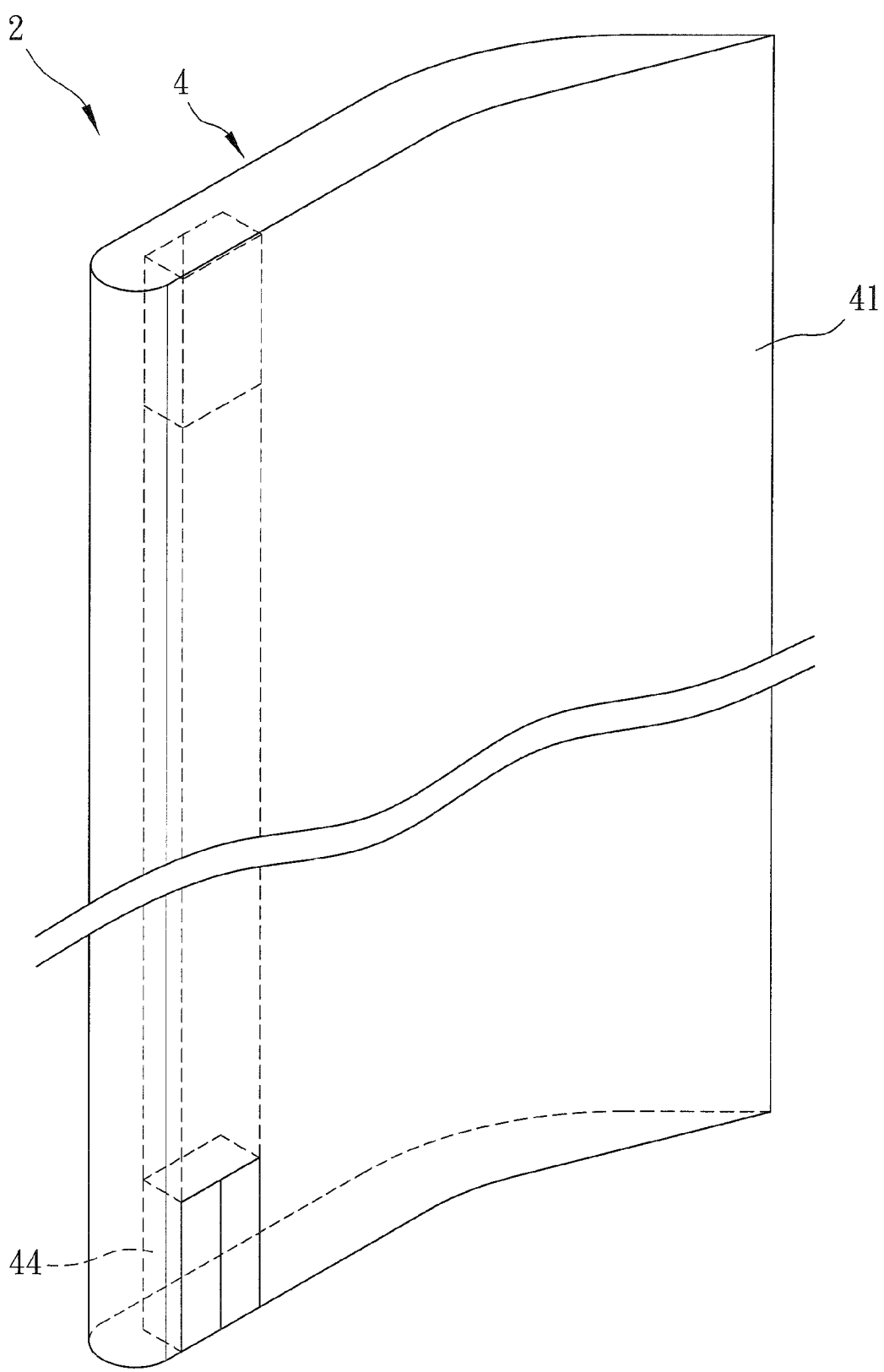
FIG. 10 is a fragmentary perspective view showing a modified example of an upright plate of a wind-collecting unit of the first preferred embodiment.
Figure 11:
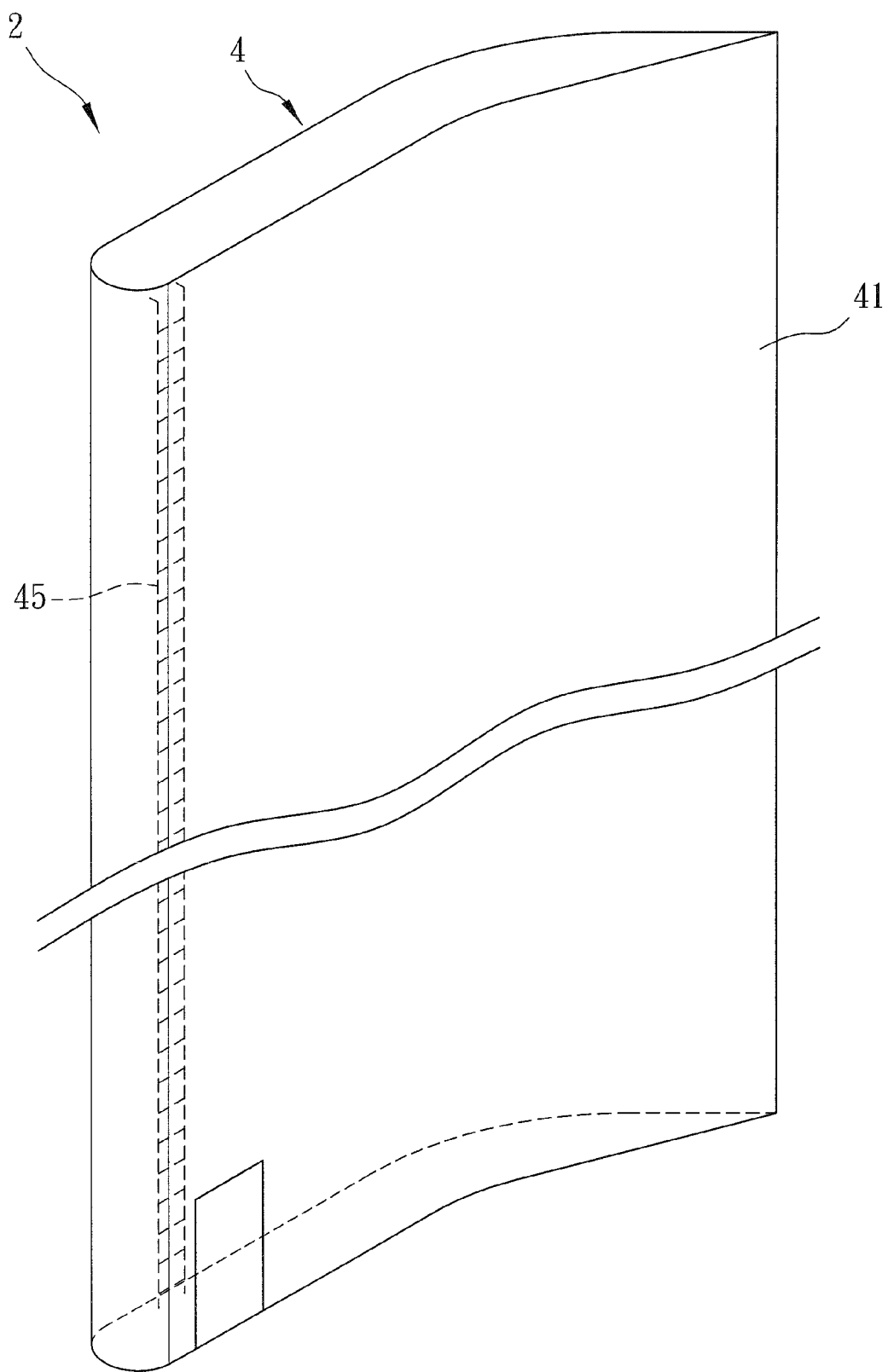
FIG. 11 is a fragmentary perspective view showing another modified example of the upright plate of the wind-collecting unit of the first preferred embodiment.

In other embodiments, an elevator 44 is disposed movably in one of the upright plates 41 of the wind-collecting unit 4, as shown in FIG. 10. Alternatively, one of the upright plates 41 of the wind-collecting unit 4 further has a plurality of stairs 45 therein, as shown in FIG. 11.

Figure 5:
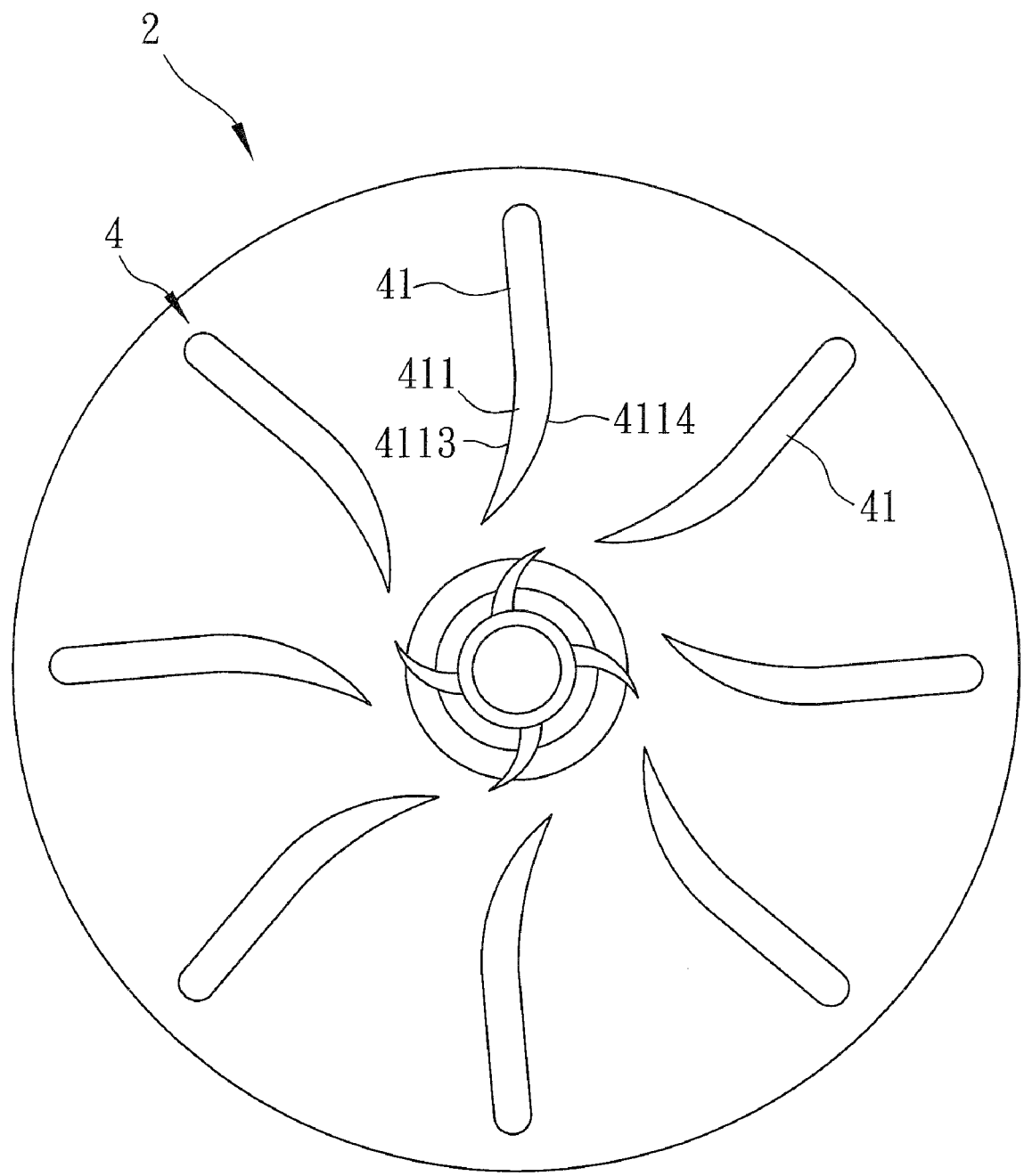
FIG. 5 is a schematic top view showing the second preferred embodiment of an apparatus for generating electric power using wind energy according to the present invention without a top wall.

FIG. 5 illustrates the second preferred embodiment of an apparatus 2 for generating electric power using wind energy according to this invention, which is a modification of the first preferred embodiment. Unlike the previous embodiment, the first end portion 412 of each upright plate 41 of the wind-collecting unit 4 has opposite curved first and second surfaces 4113, 4114.

Figure 6:
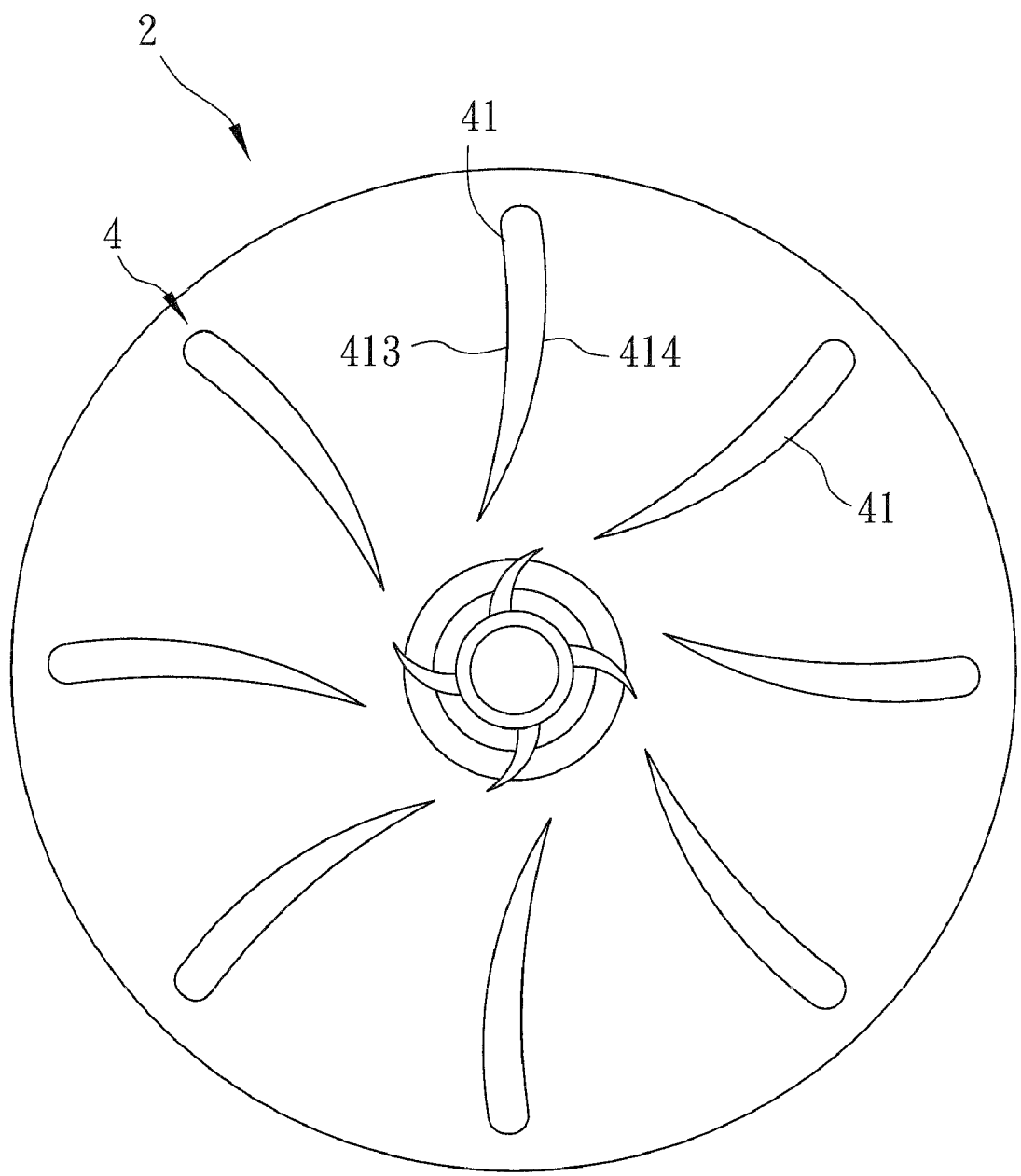
FIG. 6 is a schematic top view showing the third preferred embodiment of an apparatus for generating electric power using wind energy according to the present invention without a top wall.

FIG. 6 illustrates the third preferred embodiment of an apparatus 2 for generating electric power using wind energy according to this invention, which is a modification of the first preferred embodiment. Unlike the previous embodiments, each upright plate 41 of the wind-collecting unit 4 has opposite curved lateral surfaces 413, 414.

Figure 7:
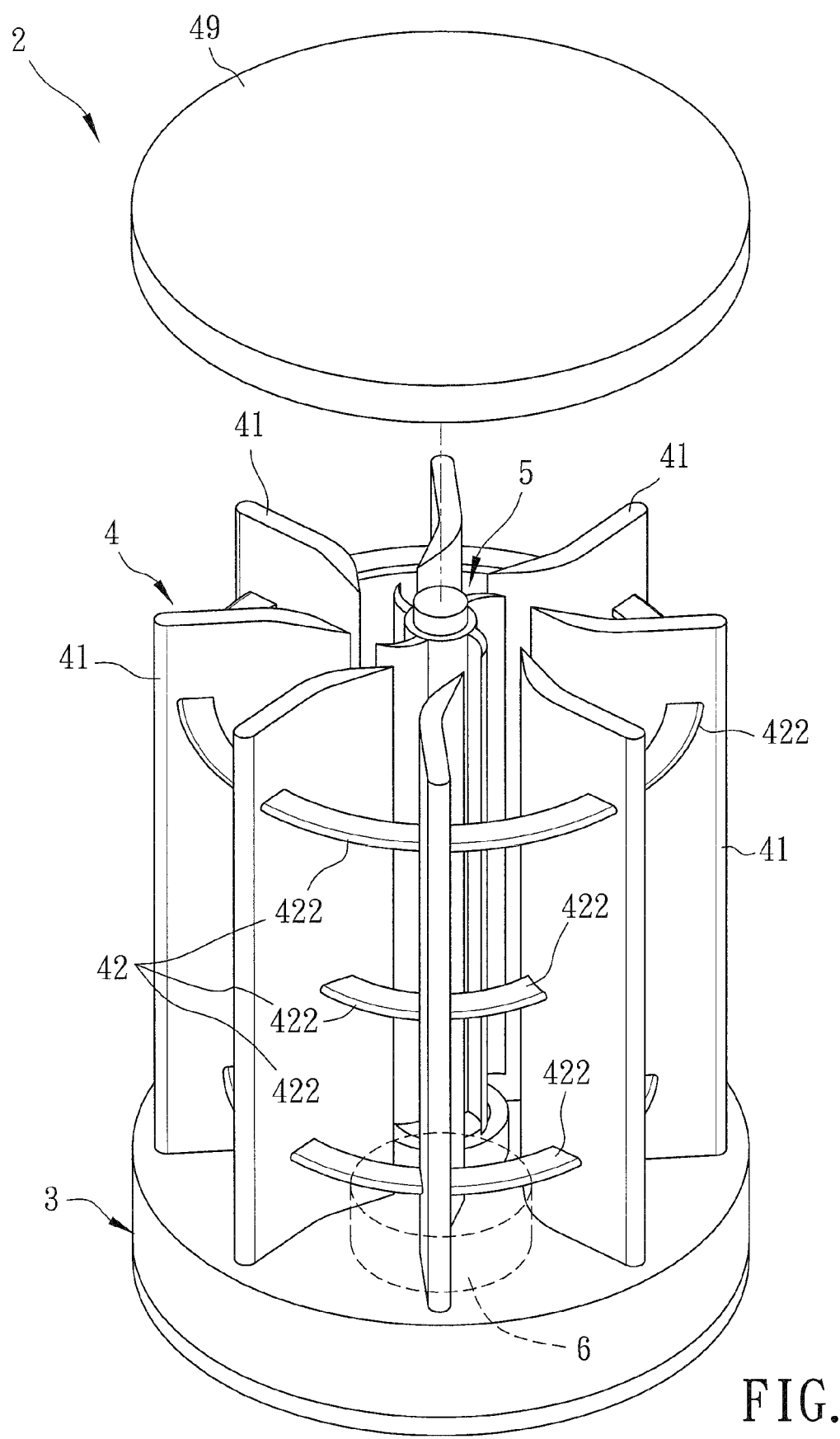
FIG. 7 is a partly exploded perspective view showing the fourth preferred embodiment of an apparatus for generating electric power using wind energy according to the present invention.

FIG. 7 illustrates the fourth preferred embodiment of an apparatus 2 for generating electric power using wind energy according to this invention, which is a modification of the first preferred embodiment. In this embodiment, the wind-collecting unit 4 further includes a plurality of connecting members 42 each interconnecting two corresponding adjacent ones of the upright plates 41. Each connecting member 42 includes a plurality of connecting plates 422.

Figure 8:
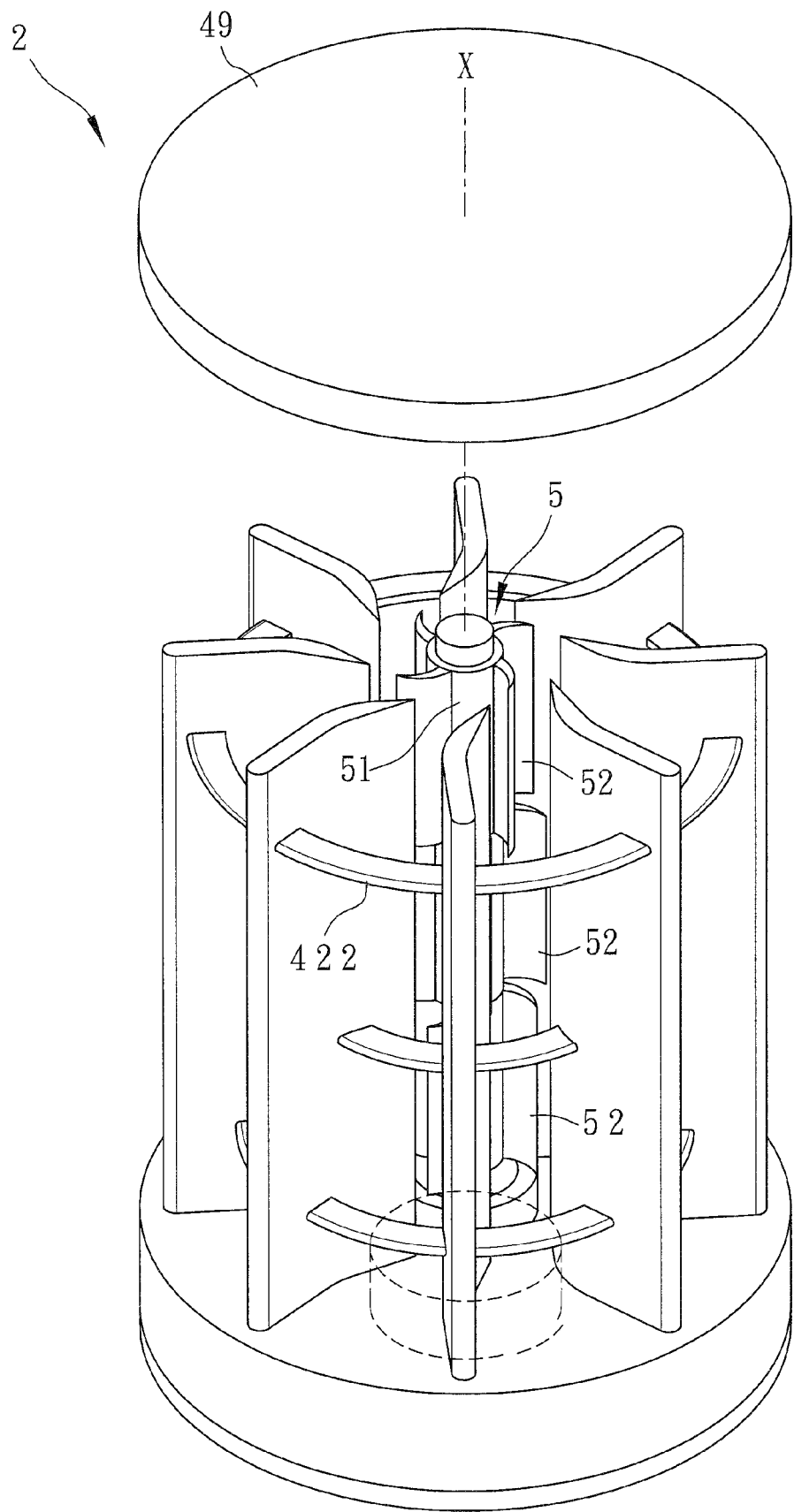
FIG. 8 is a partly exploded perspective view showing the fifth preferred embodiment of an apparatus for generating electric power using wind energy according to the present invention.
Figure 9:
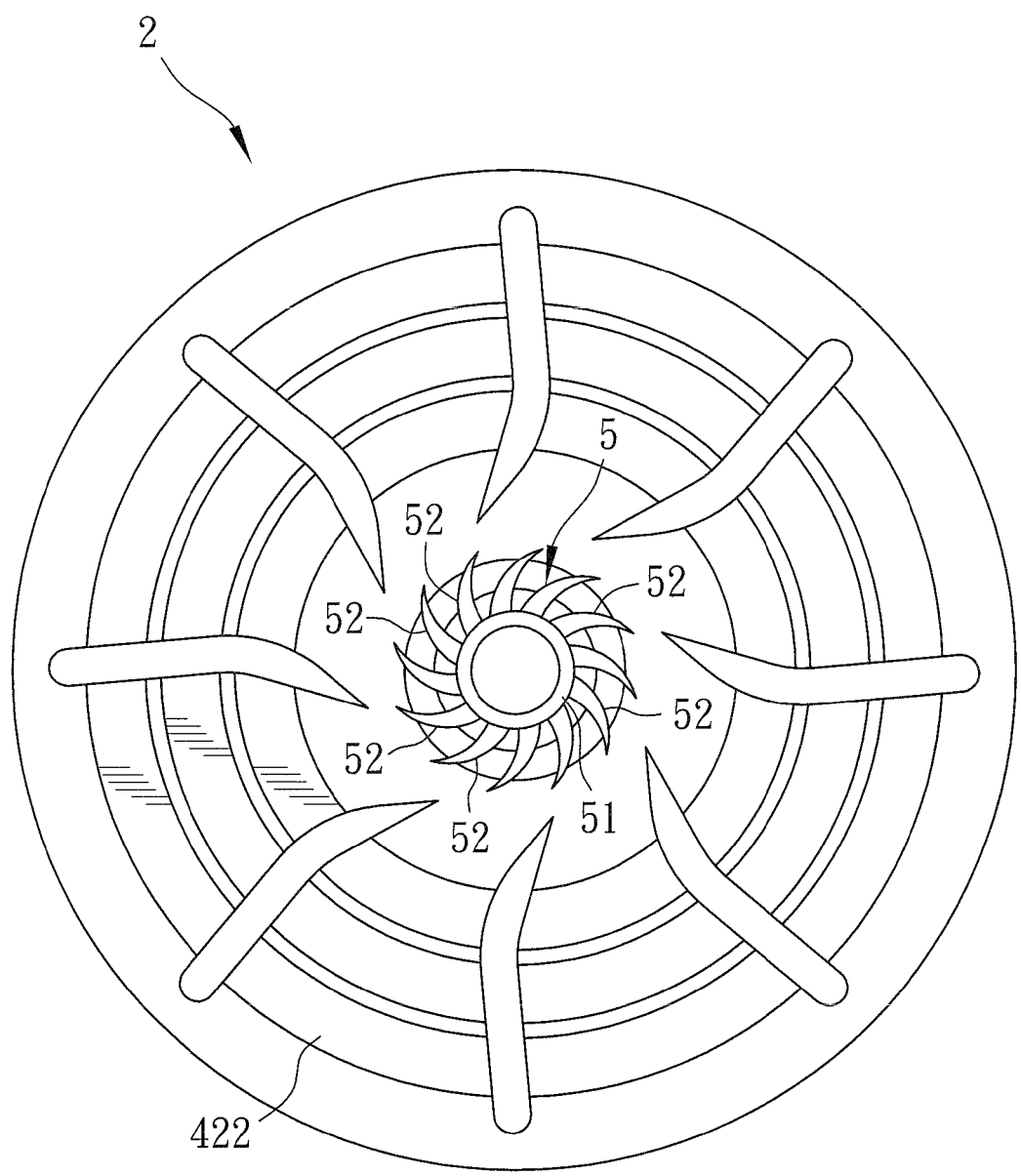
FIG. 9 is a schematic top view showing the fifth preferred embodiment without a top wall.

FIGS. 8 and 9 illustrate the fifth preferred embodiment of an apparatus for generating electric power using wind energy according to this invention, which is a modification of the fourth preferred embodiment. In this embodiment, the blade unit 5 includes a plurality of the blade members aligned in the pivot axis (X). The upright blades 52 of each blade member are angularly equidistant. The upright blades 52 of the blade members differ angularly from each other (see FIG. 9).

In sum, due to the presence of the wind-collecting unit 4, wind from different directions can be guided by the upright plates 41 to blow onto the first side surfaces 521 of the blades 52 of the blade unit 5 via the wind-guiding channels 43. Therefore, the apparatus 2 of the present invention can ensure stable electric generation even though the wind direction changes.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An apparatus for generating electric power using wind energy, comprising:
   a base;
   a blade unit including an upright rod extending vertically along a pivot axis and having a lower end disposed pivotally in said base, and an upper end, and at least one blade member having a plurality of upright blades connected fixedly to the upright rod such that said blade unit is rotatable relative to said base about the pivot axis so as to convert wind energy into a mechanical rotary power output, each of said blades having opposite first and second side surfaces, said first side surface of each of said blades facing said second side surface of an adjacent one of said blades;
   a generator disposed in said base and coupled to said lower end of said upright rod of said blade unit to convert the mechanical rotary power output into electric power; and
   a wind-collecting unit mounted fixedly on said base, and including a plurality of upright plates angularly equidistant and disposed around said blade unit, any two adjacent ones of said upright plates defining an inwardly converging wind-guiding channel therebetween;
   wherein said upright plates of said wind-collecting unit are shaped so that wind is guided by said upright plates of said wind-collecting unit to blow onto said first side surfaces of said blades of said blade member of said blade unit via said wind-guiding channels in said wind-collecting unit,
   wherein each of said upright plates of said wind-collecting unit has a first end portion adjacent to said blade unit and extending in a non-radial direction, and a second end portion opposite to said first end portion, and is bent so that an obtuse angle is formed between said first and second end portions; and
   wherein said first end portion of each of said upright plates of said wind-collecting unit has a thickness that decreases gradually toward said blade unit.

2. The apparatus as claimed in claim 1, wherein said base includes a base body, a mounting tube extending upwardly from a top side of said base body for permitting extension of said lower end of said upright rod of said blade unit into said base through said mounting tube, and a bearing disposed between an outer annular surface of said lower end of said upright rod of said blade unit and an inner annular surface of said mounting tube of said base.

3. The apparatus as claimed in claim 1, wherein the obtuse angle ranges from 135° to 165°.

4. The apparatus as claimed in claim 1, wherein said first end portion of each of said upright plates of said wind-collecting unit has a flat first surface, and a curved second surface opposite to said flat first surface.

5. The apparatus as claimed in claim 1, wherein said first end portion of each of said upright plates of said wind-collecting unit has opposite curved first and second surfaces.

6. The apparatus as claimed in claim 1, wherein each of said upright plates of said wind-collecting unit has opposite curved lateral surfaces.

7. The apparatus as claimed in claim 1, wherein said wind-collecting unit further includes a top wall mounted on top ends of said upright plates and having a bottom surface formed with a positioning groove that permits extension of said upper end of said upright rod of said blade unit thereinto and that is defined by an inner annular surface of said top wall, and a bearing disposed between said inner annular surface of said top wall and an outer annular surface of said upper end of said upright rod of said blade unit.

8. The apparatus as claimed in claim 1, wherein said wind-collecting unit further includes a plurality of connecting members each interconnecting two corresponding adjacent ones of said upright plates.

9. The apparatus as claimed in claim 8, wherein each of said connecting members includes a plurality of connecting plates.

10. The apparatus as claimed in claim 1, wherein said blade unit includes a plurality of said blade members aligned in the pivot axis, said upright blades of each of said blade members being angularly equidistant, said upright blades of each of said blade members being misaligned respectively from those of any one of the remaining blade members.

11. The apparatus as claimed in claim 1, further comprising at least one elevator disposed movably in one of said upright plates of said wind-collecting unit.

12. The apparatus as claimed in claim 1, wherein at least one of said upright plates of said wind-collecting unit further has a plurality of stairs therein.

13. An apparatus for generating electric power using wind energy, comprising:
   a base;
   a blade unit including an upright rod extending vertically along a pivot axis and having a lower end disposed pivotally in said base, and an upper end, and a plurality of blade members aligned in the pivot axis and connected fixedly to said upright rod such that said blade unit is rotatable relative to said base about the pivot axis so as to convert wind energy into a mechanical rotary power output, each of said blade members having a plurality of angularly equidistant upright blades each having opposite first and second side surfaces, said first side surface of each of said blades of each of said blade members facing said second side surface of an adjacent one of said blades of a corresponding one of said blade members, said upright blades of each of said blade members being misaligned respectively from those of any one of the remaining blade members;
   a generator disposed in said base and coupled to said lower end of said upright rod of said blade unit to convert the mechanical rotary power output into electric power; and
   a wind-collecting unit mounted fixedly on said base, and including a plurality of upright plates angularly equidistant and disposed around said blade unit, any two adjacent ones of said upright plates defining an inwardly converging wind-guiding channel therebetween;
wherein said upright plates of said wind-collecting unit are shaped so that wind is guided by said upright plates of said wind-collecting unit to blow onto said first side surfaces of said blades of said blade member of said blade unit via said wind-guiding channels in said wind-collecting unit.

* * * * *